(12) United States Patent
Nakarmi et al.

(10) Patent No.: US 10,834,580 B2
(45) Date of Patent: *Nov. 10, 2020

(54) MANAGING IDENTIFIER PRIVACY

(71) Applicant: Telefonaktiebolaget LM Ericsson (publ), Stockholm (SE)

(72) Inventors: Prajwol Kumar Nakarmi, Sollentuna (SE); Pasi Saarinen, Bromma (SE); Monica Wifvesson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/811,629

(22) Filed: Mar. 6, 2020

(65) Prior Publication Data

US 2020/0213840 A1 Jul. 2, 2020

Related U.S. Application Data

(63) Continuation of application No. 16/374,425, filed on Apr. 3, 2019, now Pat. No. 10,631,161, which is a continuation of application No. PCT/EP2019/050654, filed on Jan. 11, 2019.

(60) Provisional application No. 62/616,604, filed on Jan. 12, 2018.

(51) Int. Cl.
*H04W 12/00* (2009.01)
*H04W 8/18* (2009.01)
*H04W 12/04* (2009.01)
*H04W 76/11* (2018.01)
*H04L 9/32* (2006.01)

(52) U.S. Cl.
CPC ....... *H04W 12/0013* (2019.01); *H04L 9/3273* (2013.01); *H04W 8/183* (2013.01); *H04W 12/004* (2019.01); *H04W 12/00514* (2019.01); *H04W 12/0401* (2019.01); *H04W 12/04033* (2019.01); *H04W 76/11* (2018.02)

(58) Field of Classification Search
CPC ............................................... H04W 12/0013
See application file for complete search history.

(56) References Cited

U.S. PATENT DOCUMENTS

2018/0352556 A1* 12/2018 Loehr ............... H04W 28/0205
2019/0098502 A1* 3/2019 Torvinen ............... H04L 9/0841
2019/0149521 A1* 5/2019 Jerichow ............... H04L 9/3226
                                                                    713/171

* cited by examiner

*Primary Examiner* — William S Powers
(74) *Attorney, Agent, or Firm* — Rothwell, Figg, Ernst & Manbeck, P.C.

(57) ABSTRACT

In order to ensure that a Subscription Concealed Identifier, SUCI, is calculated in the Universal Subscriber Identity Module, USIM, part of a User Equipment, UE, when intended, when a SUCI-Calculation-Indicator is set to a value indicating that the SUCI should be calculated in the USIM, a network node sets proprietary information, which is not known to a Mobile Equipment, ME, part of the UE, as required for calculation of the SUCI. The USIM facilitates calculation of the SUCI in the ME part of the UE only when the SUCI-Calculation-Indicator is set to a value indicating that the SUCI should be calculated in the ME. When the SUCI-Calculation-Indicator is set to a value indicating that the SUCI should be calculated in the USIM, the ME part deletes any locally stored information required for calculation of the SUCI.

26 Claims, 14 Drawing Sheets

902
When a SUCI-Calculation-Indicator is set to a value indicating that the SUCI should be calculated in the USIM, setting proprietry information, which is not known to a Mobile Equipment, ME part of the UE, as required for calculation of the SUCI

Fig. 9

1000
Virtual Apparatus

1002
Setting Unit

Fig. 10

1102
When the SUCI-Calculation-Indicator is changed to a value indicating that the SUCI should be calculated in the USIM from a value indicating that the SUCI should be calculated in a Mobile Equipment, ME part of the UE, changing a pre-existing public key of the Home Network, HN

Fig. 11

1200
Virtual Apparatus

1202
Changing Unit

Fig. 12

1302
Facilitating calculation of the SUCI in a Mobile Equipment, ME, part of the UE only when a SUCI-Calculation-Indicator is set to a value indicating that the SUCI should be calculated in the ME

Fig. 13

1400
Virtual Apparatus

1402
Facilitating Unit

Fig. 14

1502
When a SUCI-Calculation-Indicator is set to a value indicating that the SUCI should be calculated in the USIM, receiving from a network node proprietary information, which is not known to a Mobile Equipment, ME, part of the UE, and which is required for calculation of the SUCI

Fig. 15

1600
Virtual Apparatus

1602
Receiving Unit

Fig. 16

1702
When a SUCI-Calculation-Indicator is changed to a value indicating that the SUCI should be calculated in the USIM from a value indicating that the SUCI should be calculated in the ME, receiving notification from a Home Network, HN of a changed public key of the HN

Fig. 17

1800
Virtual Apparatus

1802
Receiving Unit

Fig. 18

1902
When a SUCI-Calculation-Indicator is set to a value indicating that the SUCI should be calculated in the USIM, deleting any locally stored information required for calculation of the SUCI

Fig. 19

2000
Virtual Apparatus

2002
Deleting Unit

Fig. 20

MANAGING IDENTIFIER PRIVACY

CROSS-REFERENCE TO RELATED APPLICATIONS

This application is a continuation of U.S. application Ser. No. 16/374,425 filed on Apr. 3, 2019 (status pending), which is a continuation of International Patent Application No. PCT/EP2019/050654, filed Jan. 11, 2019, designating the United States and claiming priority to U.S. provisional application No. 62/616,604, filed on Jan. 12, 2018. The above identified applications are incorporated by this reference.

TECHNICAL FIELD

This relates to the calculation of an identifier.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

5G is a next generation of mobile networks developed by a standards developing organization called the 3GPP. The earlier generations of mobile networks were called 4G/LTE, 3G/UMTS, and 2G/GSM. A 5G network is maintained and its services are offered by the so-called Mobile Network Operators (MNOs). MNOs are distinguishable from each other by two types of codes, namely the Mobile Country Code (MCC) and the Mobile Network Code (MNC). To use a particular 5G network offered by a particular MNO, users are required to have a sort of contractual relationship with that MNO, that relationship being generally called the subscription. In cases when the user lacks a subscription to some particular MNO (e.g., in a so-called roaming scenario), the relationship is achieved by roaming agreements between the MNO where the user has a subscription, i.e., the user's Home Network (HN) and the MNO that the user is being served, i.e., the Visited Network (VN). Each subscription in a MNO's 5G network is identified by a unique long-term identifier called the Subscription Permanent Identifier (SUPI). Users wirelessly access a 5G network over-the-air using wireless device known as User Equipment (UE). Before providing any service, a 5G network needs to identify a user, i.e., the user's subscription, behind a UE. For this purpose of identification, UEs in earlier generation of mobile networks (4G, 3G, and 2G) used to send users' unique long-term identifier over-the-air. This was considered a privacy issue because users could be tracked or identified by any unauthorized entity capable of intercepting message or acting as man-in-the-middle over-the-air. However, in a 5G network, its MNO has an ability to offer better privacy to its users so that their unique long-term identifiers (i.e., SUPIs) are not visible over-the-air. That ability comes from a mechanism in which UEs, instead of sending SUPIs, calculate and send concealed identifiers over-the-air, which is called the Subscription Concealed Identifier (SUCI). The MNO makes available to UEs all information that are necessary for the calculation of SUCI.

The calculation of SUCI means the UE encrypting the SUPI. This is done before the SUCI is transferred over-the-air between the UE and the 5G network. The encryption is of asymmetric type and uses the HN's public key (denoted HN public key). The HN makes the HN public key available to the UE. There could be multiple ways of doing the asymmetric encryption of the SUPI for calculating the SUCI, these ways denoted as encryption schemes. Some example of the encryption schemes are ElGamal encryption scheme, Elliptic Curve Integrated Encryption Scheme (ECIES), and RSA encryption. There could also be multiple variants of the same scheme, e.g., different elliptic curves could be used with an ECIES scheme like SECP256R1, SECP384R1, and CURVE25519. These encryption schemes could either be standardized, say by the 3GPP, or be proprietary, decided by each MNO on its own. On one hand, the advantage of standardized encryption schemes is that those encryption scheme becomes publicly available or known, which increases inter-operability, e.g., all UE vendors could support the standardized schemes. On the other hand, the advantage of proprietary encryption schemes is that each MNO can independently choose and use any encryption scheme suitable to its operational efficiency, security and privacy offerings, or regulatory requirements.

Before going into further details, it is important to understand some technical aspects of a UE. The UE consists of several parts or components that altogether enables the users of the UE to access the services provided by the network. We are mainly interested in distinguishing two parts on a high level, which will assist in understanding the rest of the document. Those two parts are the Universal Subscriber Identity Module (USIM) and the Mobile Equipment (ME).

First, the USIM part is a special software application that provides various functions like providing identifier and authentication of the user's subscription, security key generations, etc. The USIM runs on a tamper resistant secure hardware component, e.g., Universal Integrated Circuit Card (UICC). Second, the ME part denotes the wireless device comprising of hardware and software needed to communicate with the network. The ME is popularly known as a mobile phone, or smart phone.

The above mentioned HN public key, along with other information, i.e., encryption scheme parameters are stored in the USIM part of the UE by the MNO. The process of the said storing is generally called provisioning. Over-the-air (OTA) updates is one example of the provisioning.

Whereas the information necessary for calculating the SUCI is stored or provisioned in the USIM part of the UE, in the UE there are two parts that may actually calculate the SUCI (i.e., computation or implementation of the encryption), either the USIM part or the ME part.

There currently exist certain challenge(s). The HN has tight control and strong trust on its USIM deployments and USIM vendors. Through the USIM, the HN controls the offering of the privacy improvements of its users. This is done by providing the USIM with information used for calculation of the SUCI, e.g., the HN public key, and encryption scheme parameters. However, the SUCI calculation can be performed not only in the USIM, but also in the ME part of the UE. In the ME, the SUCI calculation is not in control of the HN because the HN has little control over ME deployments and ME vendors. In other words, the HN is not in tight control of the offering of the privacy improvements to its users. It is challenging for the HN to ensure that SUCI is calculated in USIM or ME, wherever intended. Further, this may have security or privacy consequences, e.g., SUCI is unintentionally calculated in an erroneous part of the UE. This in turn is undesirable and harms the general good of its user's privacy.

SUMMARY

Certain aspects of the present disclosure and their embodiments may provide solutions that ensure that calculation of the SUCI is done in either the USIM or the ME, wherever intended by the HN.

There are, proposed herein, various embodiments which address one or more of the issues disclosed herein.

According to one aspect, there is provided a method of operation of a network node, to ensure that a Subscription Concealed Identifier, SUCI, is calculated in the Universal Subscriber Identity Module, USIM, part of a User Equipment, UE, when intended, the method comprising: when a SUCI-Calculation-Indicator is set to a value indicating that the SUCI should be calculated in the USIM, setting proprietary information as required for calculation of the SUCI, wherein a Mobile Equipment, ME, part of the UE does not know how to use said proprietary information for calculation of the SUCI.

According to one aspect, there is provided a method of operation of a network node, to ensure that a Subscription Concealed Identifier, SUCI, is calculated in the Universal Subscriber Identity Module, USIM, part of a User Equipment, UE, when intended, the method comprising, when the SUCI-Calculation-Indicator is changed to a value indicating that the SUCI should be calculated in the USIM from a value indicating that the SUCI should be calculated in the ME, changing a pre-existing public key of the Home Network, HN.

According to one aspect, there is provided a method of operation of a Universal Subscriber Identity Module, USIM, part of a User Equipment, UE, to ensure that a Subscription Concealed Identifier, SUCI, is calculated in the USIM when intended, the method comprising: facilitating calculation of the SUCI in a Mobile Equipment, ME, part of the UE only when a SUCI-Calculation-Indicator is set to a value indicating that the SUCI should be calculated in the ME.

According to one aspect, there is provided a method of operation of a Universal Subscriber Identity Module, USIM, part of a User Equipment, UE, to ensure that a Subscription Concealed Identifier, SUCI, is calculated in the USIM when intended, the method comprising: when a SUCI-Calculation-Indicator is set to a value indicating that the SUCI should be calculated in the USIM, receiving from a network node proprietary information, which is required for calculation of the SUCI, and which a Mobile Equipment, ME, part of the UE, does not know how to use for calculation of the SUCI.

According to one aspect, there is provided a method of operation of a Universal Subscriber Identity Module, USIM, part of a User Equipment, UE, to ensure that a Subscription Concealed Identifier, SUCI, is calculated in the USIM when intended, the method comprising, when the SUCI-Calculation-Indicator is changed to a value indicating that the SUCI should be calculated in the USIM from a value indicating that the SUCI should be calculated in the ME, receiving notification from a Home Network, HN of a changed public key of the HN.

According to one aspect, there is provided a method of operation of a Mobile Equipment, ME, part of a User Equipment, UE, to ensure that a Subscription Concealed Identifier, SUCI, is calculated in the Universal Subscriber Identity Module, USIM, part of the UE when intended, the method comprising: when a SUCI-Calculation-Indicator is set to a value indicating that the SUCI should be calculated in the USIM, deleting any locally stored information required for calculation of the SUCI.

According to one aspect, there is provided a method of operation of a Mobile Equipment, ME, part of a User Equipment, UE, the method comprising: checking a SUCI-Calculation-Indicator and calculating the SUCI only when the SUCI-Calculation-Indicator is set to a value indicating that the SUCI should be calculated in the ME.

According to further embodiments, there are provided computer programs for causing a suitably processor to perform the methods according to the previous embodiments.

In addition, there are provided computer program products, containing the respective computer programs. For example, the computer program products may comprise computer readable media containing the computer programs. The computer readable media may comprise tangible media.

Certain embodiments may provide one or more of the following technical advantage(s). For example, some solutions ensure that the HN has effective control of which part of the UE, i.e., USIM or ME, calculates the SUCI. Additionally, some solutions enable the HN to be aware of which part of the UE, i.e., USIM or ME, the SUCI calculation is performed in. Consequently, the HN gets confidence on the effectiveness of the better privacy that it is offering to its users. Further, some solutions ensure that SUCI is not unintentionally calculated in an erroneous part of the UE. All of these in turn expedite the number of better privacy offering and therefore enhances the general good of user's privacy.

BRIEF DESCRIPTION OF THE DRAWINGS

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

FIG. 9 is a flow chart, illustrating a first method;

FIG. 10 illustrates a form of a network node for performing the first method;

FIG. 11 is a flow chart, illustrating a second method;

FIG. 12 illustrates a form of a network node for performing the second method.

FIG. 13 is a flow chart, illustrating a third method;

FIG. 14 illustrates a form of a Universal Subscriber Identity Module part of a User Equipment for performing the third method;

FIG. 15 is a flow chart, illustrating a fourth method;

FIG. 16 illustrates a form of a Universal Subscriber Identity Module part of a User Equipment for performing the fourth method;

FIG. 17 is a flow chart, illustrating a fifth method;

FIG. 18 illustrates a form of a Universal Subscriber Identity Module part of a User Equipment for performing the fifth method;

FIG. 19 is a flow chart, illustrating a sixth method; and

FIG. 20 illustrates a form of a Mobile Equipment, ME, part of a User Equipment for performing the sixth method.

DETAILED DESCRIPTION

Figure 1:
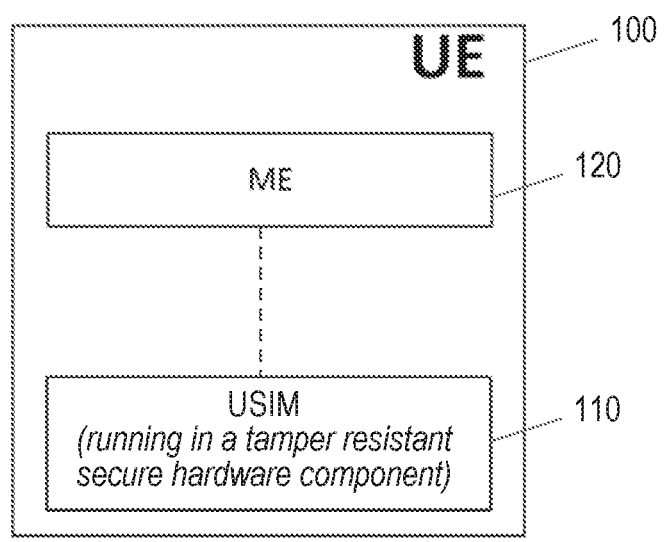
FIG. 1 is a block schematic diagram, illustrating ME and USIM parts of a UE.

FIG. 1 shows a User Equipment, UE, which consists of several parts or components that altogether enables the users of the UE to access the services provided by the network. In this document, we are mainly interested in distinguishing between two parts on a high level, namely the Universal Subscriber Identity Module (USIM) 110 and the Mobile Equipment (ME) 120. FIG. 1 illustrates a high level distinction of these parts of a UE.

First, the USIM part is a special software application that provides various functions like providing identifier and authentication of the user's subscription, security key generations, etc. The USIM runs on a tamper resistant secure hardware component, e.g., Universal Integrated Circuit Card (UICC). Second, the ME part denotes the wireless device comprising of hardware and software needed to communicate with the network. The ME may for example be a mobile phone, or smart phone, which can obtain network service when a UICC running the USIM is inserted into it.

The above mentioned HN public key, along with other information, i.e., encryption scheme parameters are stored in the USIM part of the UE by the MNO. The process of the said storing is generally called provisioning. Over-the-air (OTA) updates is one example of the provisioning.

Whereas the information necessary for calculating the SUCI is stored or provisioned in the USIM part of the UE, in the UE there are two parts that may actually calculate the SUCI (i.e., computation or implementation of the encryption), either the USIM part or the ME part.

As described earlier, with both the USIM and the ME parts of the UE allowed to calculate the SUCI, it becomes challenging for the HN to ensure that the SUCI is calculated in USIM or ME, wherever intended.

One potential solution is to make use of an indication. The indication, denoted SUCI-Calculation-Indicator, would be provisioned by the HN in the USIM and would determine which part of the UE calculates the SUCI. It could have values, e.g., "calculate in USIM", or "calculate in ME". The ME would read the value of the said SUCI-calculation-indicator from the USIM and depending on the read value, would either ask the USIM to calculate SUCI (if the value is "calculate in USIM"), or calculate the SUCI itself (if the value is "calculate in ME").

However, the above mentioned solution using the said SUCI-Calculation-Indicator is ineffective on its own. It is so because, in that solution, the ME is in control of the decision regarding where the SUCI calculation is performed. Misbehaving MEs (due to poor implementation or with malicious intent) cannot be prevented from calculating the SUCI themselves even though the SUCI-calculation-indicator had the value "calculate in USIM" as provisioned by the HN. Mind that it is the users who choose which UE (comprising the ME) to buy and use. Therefore, it is the choice of users and not the HN who decide which MEs are used. It is neither practical for the HN to audit and verify all the MEs, nor can the HN update any misbehaving MEs. As UEs become cheaper and increasingly mass produced without sufficient testing, the chances of misbehaving ME parts in the UE are likely to increase, meaning that those misbehaving MEs would behave incorrectly and not according to the 3GPP standard. As said, such incorrect behavior could lead to the ME calculating the SUCI even though the HN had chosen that the SUCI should be calculated in the USIM part of the UE. While the lack of actual HN control is an issue in itself, the issue becomes more apparent when a misbehaving ME also incorrectly implements the SUCI calculation itself, i.e., the encryption schemes, thus possibly compromising the user's privacy. To make thing worse, since incorrectly implemented encryption schemes may not lead to interoperability issues (e.g., when the calculated SUCI is technically valid, but the underlying random numbers are poorly generated), such incorrect implementations might go unnoticed leaving user's privacy at risk for a long time.

In the following, we are going to describe methods that mitigate the above mentioned problems. We propose that the USIM only conditionally facilitates SUCI calculation in ME by conditionally providing information necessary for the SUCI calculation, for example the public key of the HN, or information identifying the encryption scheme that is to be used in the SUCI calculation. For example, the USIM could avoid providing the HN public key or the encryption scheme identifier to the ME when the SUCI-Calculation-Indicator value is "calculate in USIM". The USIM would provide the HN public key or the encryption scheme identifier to the ME only when the SUCI-Calculation-Indicator value is "calculate in ME". This way, the ME would not have necessary information for the calculation of the SUCI when the SUCI-Calculation-Indicator value is "calculate in USIM". Mind that the USIM is the location where information required for calculating SUCI is stored. In this solution the USIM itself determines whether it should do the SUCI calculation according to the SUCI-Calculation-Indicator value. If the SUCI-Calculation-Indicator value is "calculate in USIM", the USIM would calculate the SUCI itself, and only provide the calculated SUCI to the ME. If the SUCI-Calculation-Indicator value is "calculate in ME", the USIM would provide the HN public key and other information required for SUCI calculation to the ME.

The intended processes are shown in FIGS. 2, 3, 4, and 5 by way of illustration.

Figure 2:
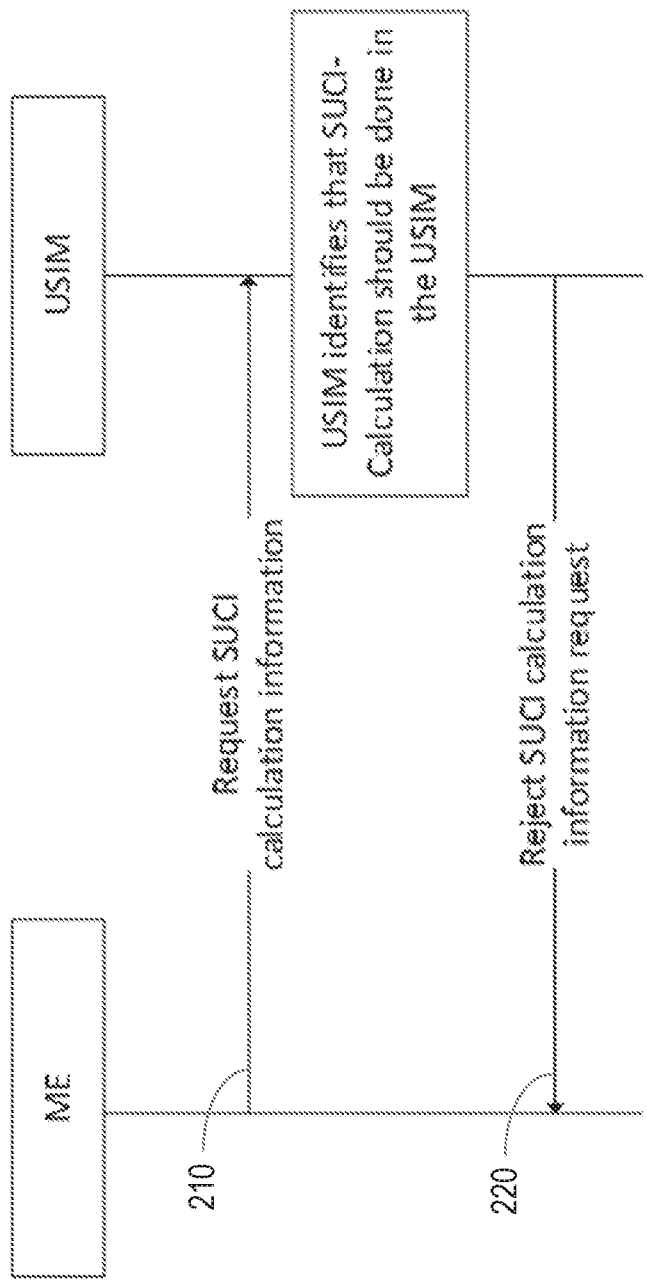
FIG. 2 is a signalling diagram, showing a first process.

FIG. 2 shows a situation in which the ME sends a message 210 to the USIM, requesting the SUCI calculation information to allow it to calculate the SUCI. However, the USIM identifies that it is set to calculate SUCI, i.e., that the said SUCI-Calculation-Indicator value is "calculate in USIM". The USIM then sends a message 220 rejecting the request for the SUCI calculation information.

Figure 3:
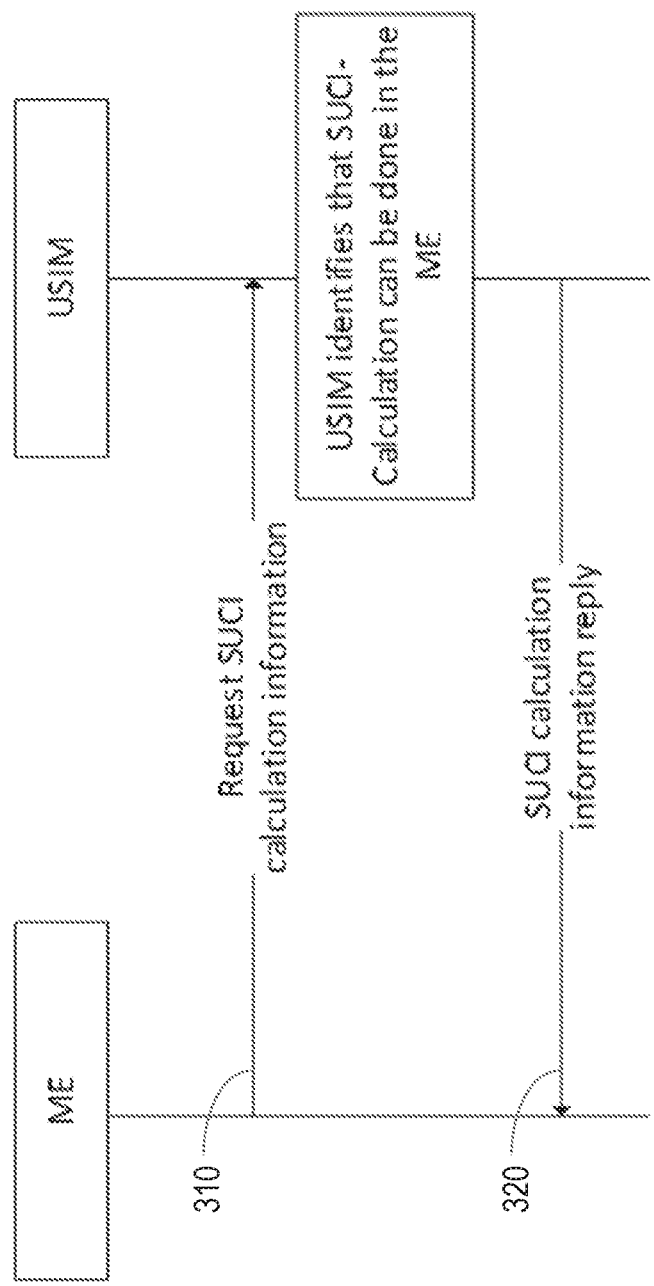
FIG. 3 is a signalling diagram, showing a further process.

FIG. 3 shows a situation in which the ME sends a message 310 to the USIM, requesting the SUCI calculation information to allow it to calculate the SUCI. In this case, the USIM identifies that the calculation of the SUCI can be performed in the ME, i.e., that the said SUCI-Calculation-Indicator value is "calculate in ME". The USIM then replies to the request by sending the SUCI calculation information 320.

Figure 4:
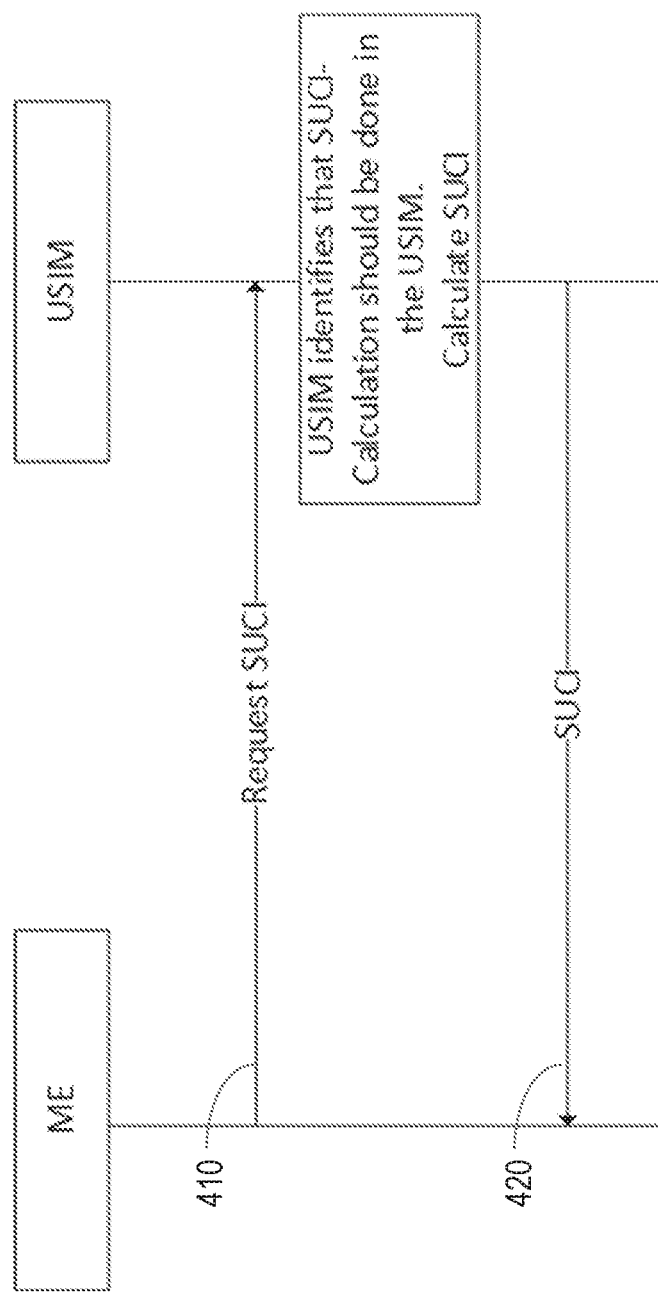
FIG. 4 is a signalling diagram, showing a further process.

FIG. 4 shows a situation in which the ME sends a message 410 to the USIM, requesting the SUCI value. The USIM identifies that it is set to calculate SUCI, i.e., that the said SUCI-Calculation-Indicator value is "calculate in USIM". The USIM therefore calculates the SUCI and transmits it to the ME in a reply message 420.

Figure 5:
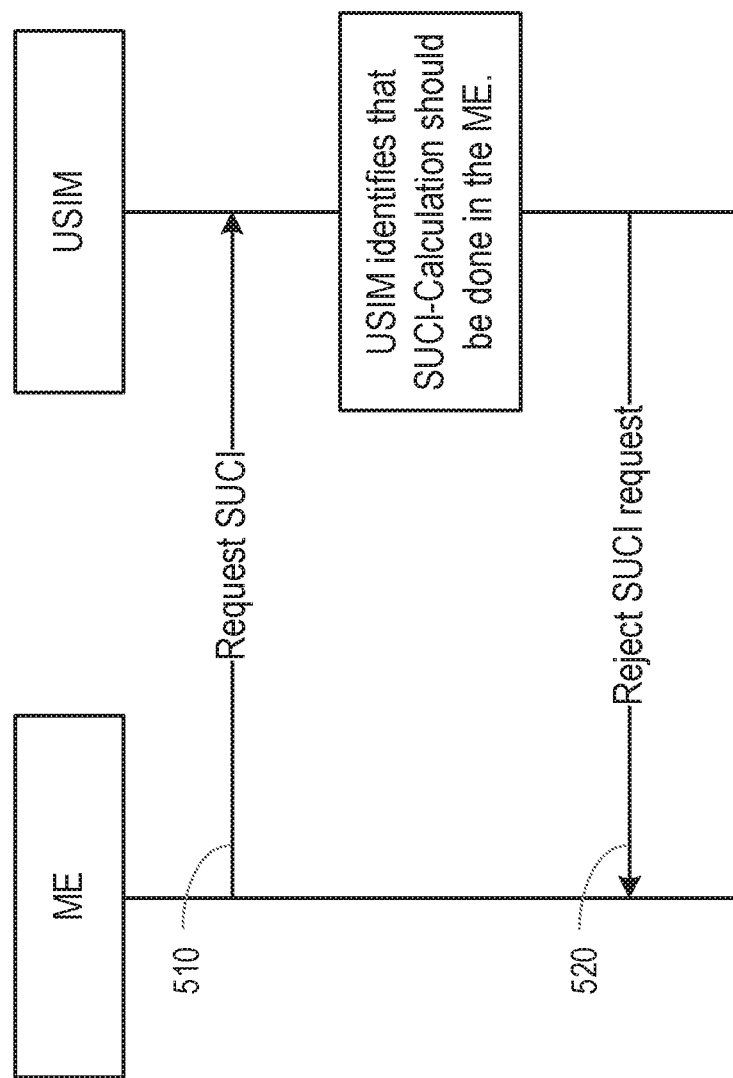
FIG. 5 is a signalling diagram, showing a further process.

FIG. 5 shows a situation in which the ME sends a message 510 to the USIM, requesting the SUCI value. However, the USIM identifies that the calculation of the SUCI can be performed in the ME, i.e., that the said SUCI-Calculation-Indicator value is "calculate in ME". The USIM then replies to the request by sending a message 520 rejecting the request for the SUCI.

Note that when the SUCI-Calculation-Indicator value is "calculate in ME", the ME could be prevented from invoking the calculation in SUCI calculation in the USIM in other ways than shown in FIG. 5, e.g., dynamically removing the module for SUCI calculation, i.e., encryption scheme module, from the USIM, dynamically changing the module for SUCI calculation in the USIM to return an error or returning information necessary for SUCI calculation (denoted as SUCI calculation information) instead of a reject message. Depending on some consciously designed or allowed configuration or policy, the USIM could as well calculate SUCI when requested by the ME, even when the SUCI-Calculation-Indicator value is "calculate in ME".

It is also our teaching that the USIM could as well always provide to ME at least the SUCI-Calculation-Indicator value. Referring to the FIGS. 2, 3, 4, and 5, doing so would allow the ME to first read or check the SUCI-Calculation-Indicator value and perform the shown "Request SUCI calculation information" only if the SUCI-Calculation-Indicator value is "calculate in ME". In addition, doing so enables the ME to delete any cached or stored information from earlier time.

Having the USIM conditionally provide the information necessary for SUCI calculation to the ME works. Nevertheless, it is still not sufficient on its own. Mind that the said information that the USIM would not provide to the ME (e.g., SUPI, HN public key, encryption scheme parameters, etc.) is not strictly meant to be hidden from the ME. For example, asymmetric encryption schemes are not designed to hide the public key. The name HN public key itself suggests that said key is public and not private. Therefore, theoretically, it could be assumed that the ME would somehow have access to the information necessary for SUCI calculation, even though the USIM does not provide them.

Another scenario in which the ME would have access to information necessary for SUCI calculation is when the SUCI-Calculation-Indicator value was originally provisioned as "calculate in ME" by the HN in the USIM. So, the USIM would provide the information necessary for SUCI calculation to the ME. Next, for some reason, the HN could decide to change or re-provision the SUCI-Calculation-Indicator value in the USIM to "calculate in USIM". The HN might do this to avoid incorrect implementation of a SUCI calculation in a misbehaving ME. In such case, the ME could have cached the information necessary for SUCI calculation from earlier time. Thus, although the SUCI-Calculation-Indicator value is now "calculate in USIM", the ME has access to the information necessary for SUCI calculation. It is therefore our teaching that, when the HN provisions or re-provisions the SUCI-Calculation-Indicator value in the USIM to "calculate in USIM", the HN changes any pre-existing, if any, HN public key and preferably other relevant information as well like identifier of the HN public key, so that any earlier caching done by the ME becomes invalid.

However, changing the HN public key could be a demanding and operationally complex procedure. Next, we describe a more efficient mechanism. Mind that in order for the 5G network to decrypt the SUCI that was calculated by the UE, both the UE and the 5G network would need to be able to mutually identify the encryption scheme that the UE used when calculating the SUCI. This mutual identification could be done by an identifier called the encryption scheme identifier. Again, recall that the encryption schemes are either standardized or proprietary. So correspondingly, the standardized encryption scheme would need standardized encryption scheme identifiers, and the proprietary encryption schemes would need proprietary encryption scheme identifiers. We point out that among standardized and proprietary encryption schemes, it is the standardized encryption schemes that could have been implemented in ME, meaning that it is the standardized encryption schemes that the ME could use on its own even when the SUCI-Calculation-Indicator value is "calculate in USIM". It is so because the ME would not know what proprietary encryption schemes are and therefore could not have implemented them, meaning that the ME would not be able to use proprietary encryption schemes on its own when the SUCI-Calculation-Indicator value is "calculate in USIM". So, it is our teaching that when the HN provisions or re-provisions the SUCI-Calculation-Indicator value in the USIM to "calculate in USIM", a proprietary encryption scheme identifier is chosen and provisioned by the HN even when the encryption scheme is a standardized one. The effect will be that even though the ME has the information necessary for calculating the SUCI, the ME would not know which encryption scheme to use, because the encryption scheme identifier is not a standardized one. The relationship between the encryption scheme and the encryption scheme identifier is therefore proprietary information that is required for calculation of the SUCI, but the ME does not know how to use said proprietary information for calculation of the SUCI because it does not know this relationship. Therefore, the ME would have to let the USIM calculate the SUCI.

Another possibility is that, when the HN provisions or re-provisions the SUCI-Calculation-Indicator value in the USIM to "calculate in USIM", a proprietary encryption scheme is chosen and correspondingly a proprietary encryption scheme identifier. In this case, the proprietary encryption scheme is set as required for calculation of the SUCI, and the ME does not know how to use said proprietary information for calculation of the SUCI.

Additionally, it is also our teaching that when the HN provisions or re-provisions the SUCI-Calculation-Indicator value in the USIM the USIM informs or notifies the ME about the said change. The USIM could use USIM application Toolkit (USAT) command called REFRESH to the ME so that the ME could be triggered to re-read the SUCI-Calculation-Indicator value from the USIM. Doing so avoids the situation when the ME would have read the SUCI-Calculation-Indicator value "calculate in ME" and would continue to itself calculate SUCI even when the SUCI-Calculation-Indicator has changed to "calculate in USIM".

It should be appreciated that with our proposals or teachings, the ME would not be able to calculate the SUCI even when the ME can read or has access to the information necessary for SUCI calculation. This gives the HN an effective control over whether the ME or USIM does the actual calculation of the SUCI. Further, with our proposals, misbehaving MEs would be easily detectable both by the HN and the user as those MEs would not be able to receive the network service.

Figure 6:
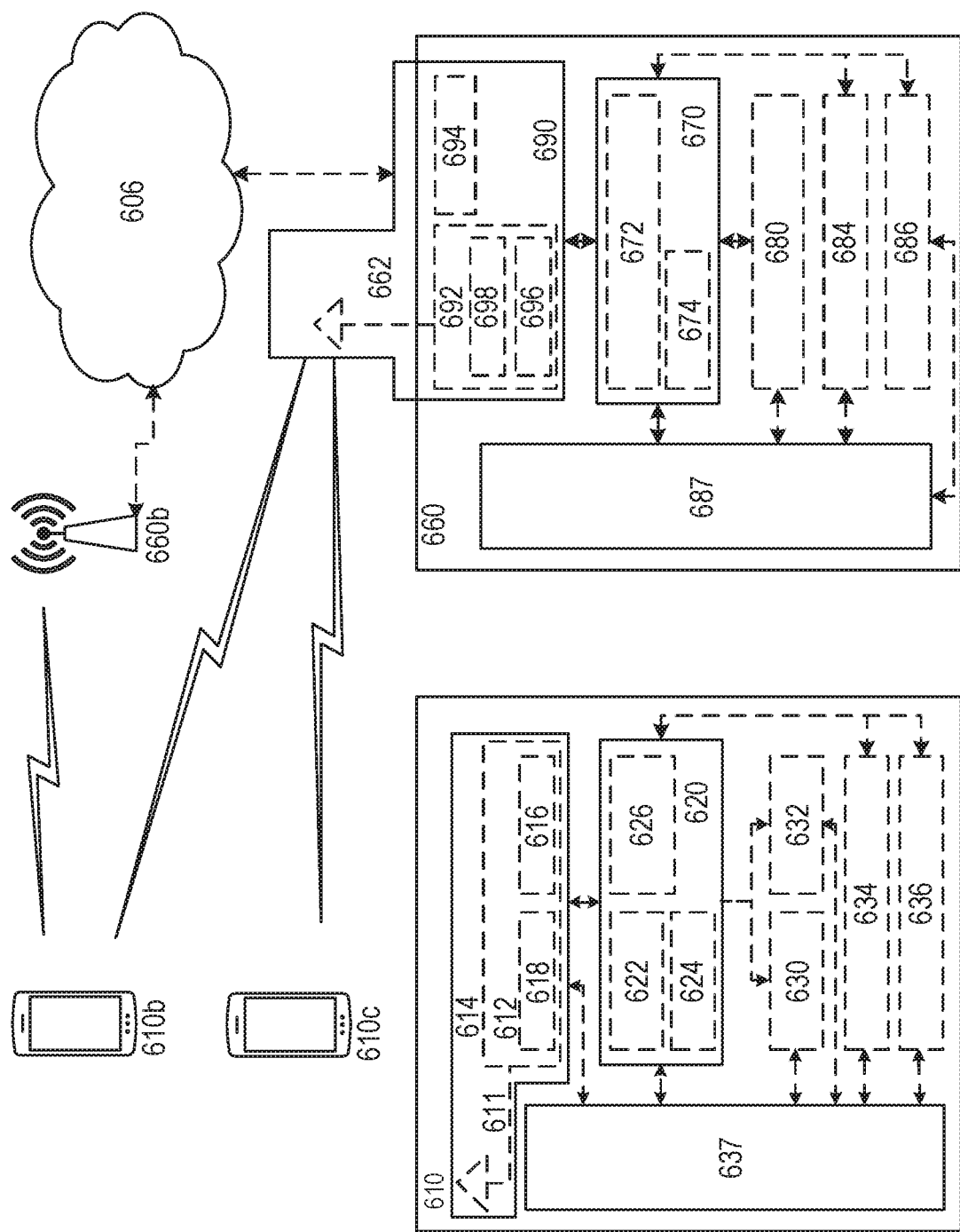
FIG. 6 illustrates a communication network, including network nodes and wireless devices.

FIG. 6 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 606, network nodes 660 and 660b, and WDs 610, 610b, and 610c. In practice, a wireless network may further include any additional elements suitable to support communication between wireless devices or between a wireless device and another communication device, such as a landline telephone, a service provider, or any other network node or end device. Of the illustrated components, network node 660 and wireless device (WD) 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 and WD 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 660 includes processing circuitry 670, device readable medium 680, interface 690, auxiliary equipment 684, power source 686, power circuitry 687, and antenna 662. Although network node 660 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard drives as well as multiple RAM modules).

Although the illustrated network node 660 is a radio access network node, the methods described herein may be used in any network node or network function, including, by way of example only, and without any limitation, core network nodes such as an Access and Mobility Management Function (AMF) or Security Anchor Function (SEAF); an Authentication Server Function (AUSF); or a Unified Data Management (UDM) or Subscription Identifier De-concealing Function (SIDF) function. In the case of such core network nodes, the respective network node may include any or all of the components shown in FIG. 6, but may not include the wireless communication functionality shown in the Figure.

Similarly, network node 660 may be composed of multiple physically separate components (e.g., a NodeB component and a RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 660 may be configured to support multiple radio access technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner In any of those embodiments, whether executing instructions stored on a device readable storage medium or not, processing circuitry 670 can be configured to perform the described functionality. The benefits provided by such functionality are not limited to processing circuitry 670 alone or to other components of network node 660, but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signalling and/or data between network node 660, network 606, and/or WDs 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or WDs via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692, instead, processing circuitry 670 may comprise radio front end circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 690 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node and/or any other network equipment. Similarly, antenna 662, interface 690, and/or processing circuitry 670 may be configured to perform any transmitting operations described herein as being performed by a network node. Any information, data and/or signals may be transmitted to a wireless device, another network node and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660. For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 6 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. WD 610 may include multiple sets of one or more of the illustrated components for different wireless technologies supported by WD 610, such as, for example, GSM, WCDMA, LTE, NR, WiFi, WiMAX, or Bluetooth wireless technologies, just to mention a few. These wireless technologies may be integrated into the same or different chips or set of chips as other components within WD 610.

Antenna 611 may include one or more antennas or antenna arrays, configured to send and/or receive wireless signals, and is connected to interface 614. In certain alternative embodiments, antenna 611 may be separate from WD 610 and be connectable to WD 610 through an interface or port. Antenna 611, interface 614, and/or processing circuitry 620 may be configured to perform any receiving or transmitting operations described herein as being performed by a WD. Any information, data and/or signals may be received from a network node and/or another WD. In some embodiments, radio front end circuitry and/or antenna 611 may be considered an interface.

As illustrated, interface 614 comprises radio front end circuitry 612 and antenna 611. Radio front end circuitry 612 comprise one or more filters 618 and amplifiers 616. Radio front end circuitry 614 is connected to antenna 611 and processing circuitry 620, and is configured to condition signals communicated between antenna 611 and processing circuitry 620. Radio front end circuitry 612 may be coupled to or a part of antenna 611. In some embodiments, WD 610 may not include separate radio front end circuitry 612; rather, processing circuitry 620 may comprise radio front end circuitry and may be connected to antenna 611. Similarly, in some embodiments, some or all of RF transceiver circuitry 622 may be considered a part of interface 614. Radio front end circuitry 612 may receive digital data that is to be sent out to other network nodes or WDs via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 610 components, such as device readable medium 630, WD 610 functionality. Such functionality may include providing any of the various wireless features or benefits discussed herein. For example, processing circuitry 620 may execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of WD 610 may comprise a SOC. In some embodiments, RF transceiver circuitry 622, baseband processing circuitry 624, and application processing circuitry 626 may be on separate chips or sets of chips. In alternative embodiments, part or all of baseband processing circuitry 624 and application processing circuitry 626 may be combined into one chip or set of chips, and RF transceiver circuitry 622 may be on a separate chip or set of chips. In still alternative embodiments, part or all of RF transceiver circuitry 622 and baseband processing circuitry 624 may be on the same chip or set of chips, and application processing circuitry 626 may be on a separate chip or set of chips. In yet other alternative embodiments, part or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a WD may be provided by processing circuitry 620 of the ME part of the UE or WD. Other functionality may be performed by a USIM function running on a removable, tamper-resistant storage device such as a UICC, which may be represented here by device readable medium 630. Some or all of the functionality of the ME part may be provided by processing circuitry 620 without executing instructions stored on a separate or discrete device readable storage medium, such as in a hard-wired manner In any of those particular embodiments, whether executing instructions stored on a device readable storage medium or not, processing circuitry 620 can be configured to perform the described functionality. The benefits provided by such functionality are not limited to processing circuitry 620 alone or to other components of WD 610, but are enjoyed by WD 610 as a whole, and/or by end users and the wireless network generally.

Processing circuitry 620 may be configured to perform any determining, calculating, or similar operations (e.g., certain obtaining operations) described herein as being performed by a WD. These operations, as performed by processing circuitry 620, may include processing information obtained by processing circuitry 620 by, for example, converting the obtained information into other information, comparing the obtained information or converted information to information stored by WD 610, and/or performing one or more operations based on the obtained information or converted information, and as a result of said processing making a determination.

Device readable medium 630 may be operable to store a computer program, software, an application including one or more of logic, rules, code, tables, etc. and/or other instructions capable of being executed by processing circuitry 620. Device readable medium 630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated.

User interface equipment 632 may provide components that allow for a human user to interact with WD 610. Such interaction may be of many forms, such as visual, audial, tactile, etc. User interface equipment 632 may be operable to produce output to the user and to allow the user to provide input to WD 610. The type of interaction may vary depending on the type of user interface equipment 632 installed in WD 610. For example, if WD 610 is a smart phone, the interaction may be via a touch screen; if WD 610 is a smart meter, the interaction may be through a screen that provides usage (e.g., the number of gallons used) or a speaker that provides an audible alert (e.g., if smoke is detected). User interface equipment 632 may include input interfaces, devices and circuits, and output interfaces, devices and circuits. User interface equipment 632 is configured to allow input of information into WD 610, and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from WD 610, and to allow processing circuitry 620 to output information from WD 610. User interface equipment 632 may include, for example, a speaker, a display, vibrating circuitry, a USB port, a headphone interface, or other output circuitry. Using one or more input and output interfaces, devices, and circuits, of user interface equipment 632, WD 610 may communicate with end users and/or the wireless network, and allow them to benefit from the functionality described herein.

Auxiliary equipment 634 is operable to provide more specific functionality which may not be generally performed by WDs. This may comprise specialized sensors for doing measurements for various purposes, interfaces for additional types of communication such as wired communications etc. The inclusion and type of components of auxiliary equipment 634 may vary depending on the embodiment and/or scenario.

Power source 636 may, in some embodiments, be in the form of a battery or battery pack. Other types of power sources, such as an external power source (e.g., an electricity outlet), photovoltaic devices or power cells, may also be used. WD 610 may further comprise power circuitry 637 for delivering power from power source 636 to the various parts of WD 610 which need power from power source 636 to carry out any functionality described or indicated herein. Power circuitry 637 may in certain embodiments comprise power management circuitry. Power circuitry 637 may additionally or alternatively be operable to receive power from an external power source; in which case WD 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of WD 610 to which power is supplied.

Figure 7:
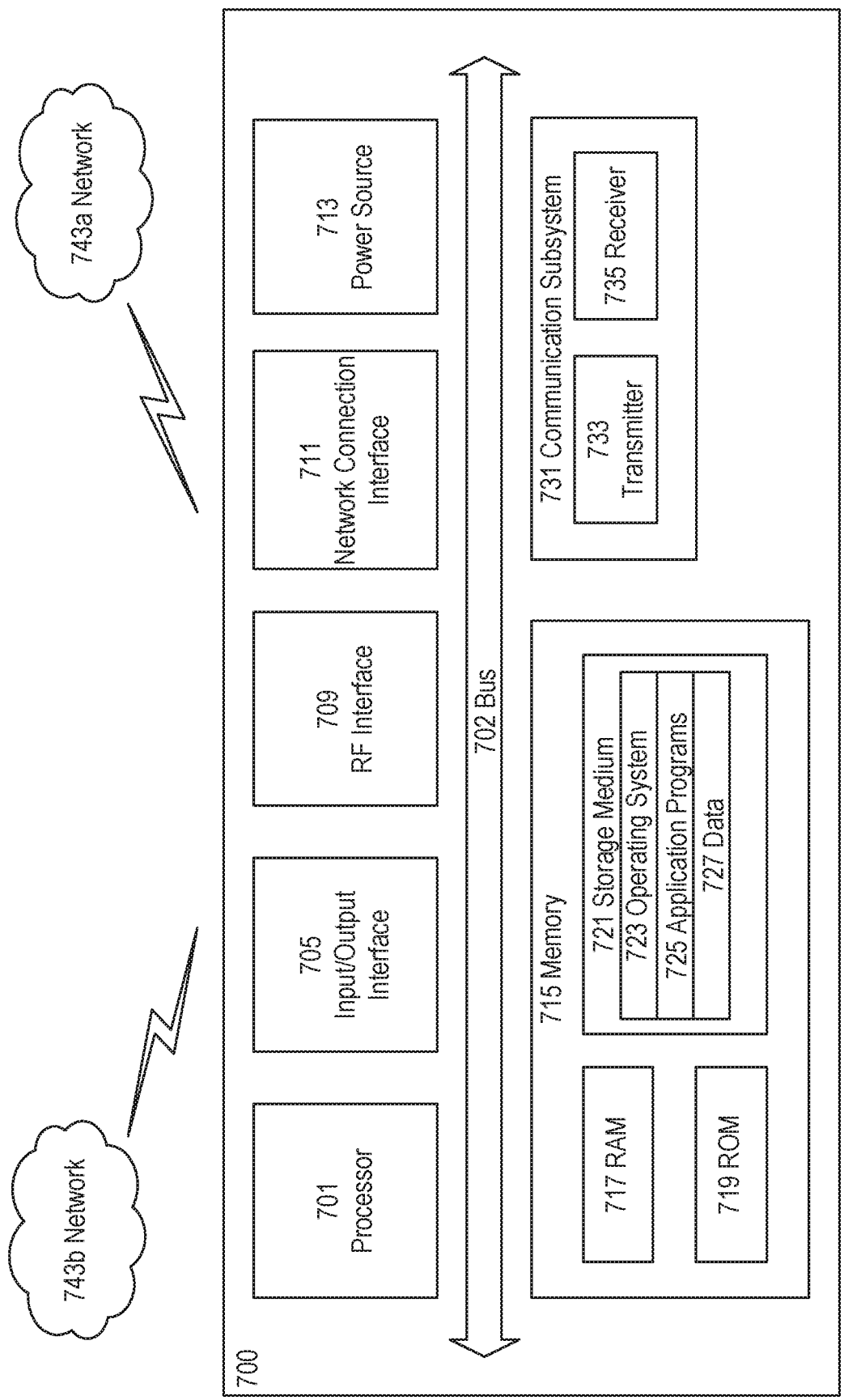
FIG. 7 illustrates in more detail a form of a wireless device.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 700 may be any UE identified by the $3^{rd}$ Generation Partnership Project (3GPP), including a NB-IoT UE, a machine type communication (MTC) UE, and/or an enhanced MTC (eMTC) UE. UE 700, as illustrated in FIG. 7, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 700 includes processing circuitry 701 that is operatively coupled to input/output interface 705, radio frequency (RF) interface 709, network connection interface 711, memory 715 including random access memory (RAM) 717, read-only memory (ROM) 719, and storage medium 721 or the like, communication subsystem 731, power source 733, and/or any other component, or any combination thereof. Storage medium 721 includes operating system 723, application program 725, and data 727. In other embodiments, storage medium 721 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 701 may be configured to process computer instructions and data. Processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 701 may include two central processing units (CPUs). Data may be information in a form suitable for use by a computer.

In the depicted embodiment, input/output interface 705 may be configured to provide a communication interface to an input device, output device, or input and output device. UE 700 may be configured to use an output device via input/output interface 705. An output device may use the same type of interface port as an input device. For example, a USB port may be used to provide input to and output from UE 700. The output device may be a speaker, a sound card, a video card, a display, a monitor, a printer, an actuator, an emitter, a smartcard, another output device, or any combination thereof. UE 700 may be configured to use an input device via input/output interface 705 to allow a user to capture information into UE 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 709 may be configured to provide a communication interface to RF components such as a transmitter, a receiver, and an antenna. Network connection interface 711 may be configured to provide a communication interface to network 743a. Network 743a may encompass wired and/or wireless networks such as a local-area network (LAN), a wide-area network (WAN), a computer network, a wireless network, a telecommunications network, another like network or any combination thereof. For example, network 743a may comprise a Wi-Fi network. Network connection interface 711 may be configured to include a receiver and a transmitter interface used to communicate with one or more other devices over a communication network according to one or more communication protocols, such as Ethernet, TCP/IP, SONET, ATM, or the like. Network connection interface 711 may implement receiver and transmitter functionality appropriate to the communication network links (e.g., optical, electrical, and the like). The transmitter and receiver functions may share circuit components, software or firmware, or alternatively may be implemented separately.

RAM 717 may be configured to interface via bus 702 to processing circuitry 701 to provide storage or caching of data or computer instructions during the execution of software programs such as the operating system, application programs, and device drivers. ROM 719 may be configured to provide computer instructions or data to processing circuitry 701. For example, ROM 719 may be configured to store invariant low-level system code or data for basic system functions such as basic input and output (I/O), startup, or reception of keystrokes from a keyboard that are stored in a non-volatile memory. Storage medium 721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 721 may be configured to include operating system 723, application program 725 such as a web browser application, a widget or gadget engine or another application, and data file 727. Storage medium 721 may store, for use by UE 700, any of a variety of various operating systems or combinations of operating systems.

Storage medium 721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 721 may allow UE 700 to access computer-executable instructions, application programs or the like, stored on transitory or non-transitory memory media, to off-load data, or to upload data. An article of manufacture, such as one utilizing a communication system may be tangibly embodied in storage medium 721, which may comprise a device readable medium.

In FIG. 7, processing circuitry 701 may be configured to communicate with network 743b using communication subsystem 731. Network 743a and network 743b may be the same network or networks or different network or networks. Communication subsystem 731 may be configured to include one or more transceivers used to communicate with network 743b. For example, communication subsystem 731 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 733 and/or receiver 735 to implement transmitter or receiver functionality, respectively, appropriate to the RAN links (e.g., frequency allocations and the like). Further, transmitter 733 and receiver 735 of each transceiver may share circuit components, software or firmware, or alternatively may be implemented separately.

In the illustrated embodiment, the communication functions of communication subsystem 731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 731 may include cellular communication, Wi-Fi communication, Bluetooth communication, and GPS communication. Network 743b may encompass wired and/or wireless networks such as a local-area network (LAN), a wide-area network (WAN), a computer network, a wireless network, a telecommunications network, another like network or any combination thereof. For example, network 743b may be a cellular network, a Wi-Fi network, and/or a near-field network. Power source 713 may be configured to provide alternating current (AC) or direct current (DC) power to components of UE 700.

The features, benefits and/or functions described herein may be implemented in one of the components of UE 700 or partitioned across multiple components of UE 700. Further, the features, benefits, and/or functions described herein may be implemented in any combination of hardware, software or firmware. In one example, communication subsystem 731 may be configured to include any of the components described herein. Further, processing circuitry 701 may be configured to communicate with any of such components over bus 702. In another example, any of such components may be represented by program instructions stored in memory that when executed by processing circuitry 701 perform the corresponding functions described herein. In another example, the functionality of any of such components may be partitioned between processing circuitry 701 and communication subsystem 731. In another example, the non-computationally intensive functions of any of such components may be implemented in software or firmware and the computationally intensive functions may be implemented in hardware.

Figure 8:
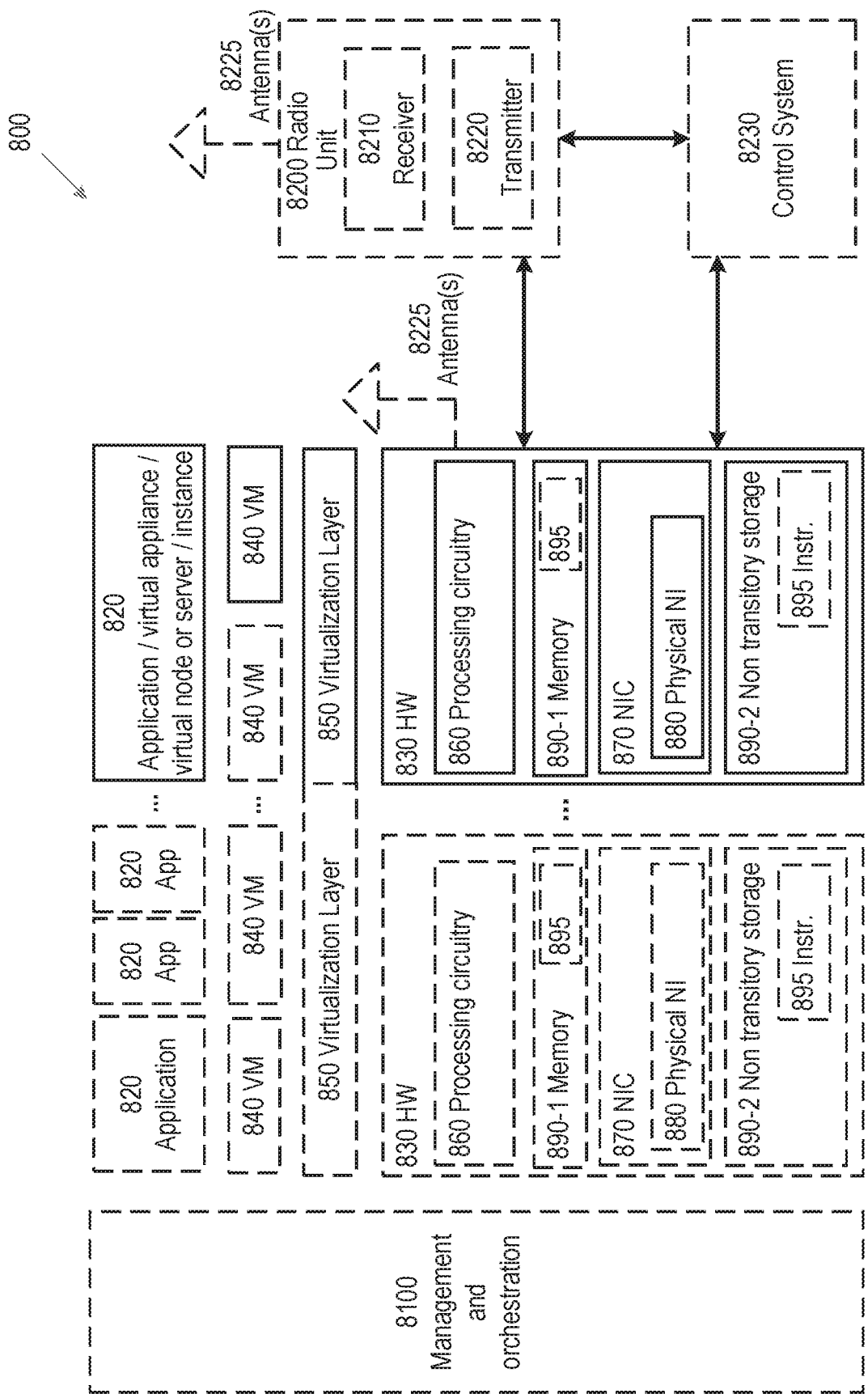
FIG. 8 illustrates in more detail a form of a network node.

FIG. 8 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 8, hardware 830 may be a standalone network node with generic or specific components. Hardware 830 may comprise antenna 8225 and may implement some functions via virtualization. Alternatively, hardware 830 may be part of a larger cluster of hardware (e.g. such as in a data center or customer premise equipment (CPE)) where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and corresponds to application 820 in FIG. 8.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signalling can be effected with the use of control system 8230 which may alternatively be used for communication between the hardware nodes 830 and radio units 8200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

FIG. 9 depicts a first method in accordance with particular embodiments, specifically a method of operation of a network node, to ensure that a Subscription Concealed Identifier, SUCI, is calculated in the Universal Subscriber Identity Module, USIM, part of a User Equipment, UE, when intended. The method may be performed in any network node that is in direct or indirect communication with the UE. The method comprises step 902, namely, when a SUCI-Calculation-Indicator is set to a value indicating that the SUCI should be calculated in the USIM, setting proprietary information, which is not known to a Mobile Equipment, ME, part of the UE, as required for calculation of the SUCI.

The proprietary information may comprise a relationship between a proprietary encryption scheme identifier and a SUCI calculation encryption scheme. In that case, the SUCI calculation encryption scheme may be standardized.

The proprietary information may comprise a proprietary encryption scheme.

The method may further comprise, when the SUCI-Calculation-Indicator is changed to a value indicating that the SUCI should be calculated in the USIM from a value indicating that the SUCI should be calculated in the ME, changing a pre-existing public key of the Home Network, HN. When the SUCI-Calculation-Indicator is changed to the value indicating that the SUCI should be calculated in the USIM from the value indicating that the SUCI should be calculated in the ME, an identifier of the public key of the HN may be changed.

FIG. 10 illustrates a schematic block diagram of an apparatus 1000 in a wireless network (for example, the wireless network shown in FIG. 6). The apparatus may be implemented in a network node (e.g., network node 660 shown in FIG. 6). Apparatus 1000 is operable to carry out the example method described with reference to FIG. 9 and possibly any other processes or methods disclosed herein. It is also to be understood that the method of FIG. 9 is not necessarily carried out solely by apparatus 1000. At least some operations of the method can be performed by one or more other entities.

Virtual Apparatus 1000 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause setting unit 1002 and any other suitable units of apparatus 1000 to perform corresponding functions according to one or more embodiments of the present disclosure.

As illustrated in FIG. 10, apparatus 1000 comprises a network node, and includes setting unit 1002 for, when a SUCI-Calculation-Indicator is set to a value indicating that the SUCI should be calculated in the USIM, setting proprietary information, which is not known to a Mobile Equipment, ME, part of the UE, as required for calculation of the SUCI.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

FIG. 11 depicts a second method in accordance with particular embodiments, and specifically a method of operation of a network node, to ensure that a Subscription Concealed Identifier, SUCI, is calculated in the Universal Subscriber Identity Module, USIM, part of a User Equipment, UE, when intended. The method may be performed in any network node that is in direct or indirect communication with the UE. The method comprises step 1102, namely, when the SUCI-Calculation-Indicator is changed to a value indicating that the SUCI should be calculated in the USIM from a value indicating that the SUCI should be calculated in a Mobile Equipment, ME, part of the UE, changing a pre-existing public key of the Home Network, HN.

The method may further comprise, when the SUCI-Calculation-Indicator is changed to the value indicating that the SUCI should be calculated in the USIM from the value indicating that the SUCI should be calculated in the ME, changing an identifier of the public key of the HN.

FIG. 12 illustrates a schematic block diagram of an apparatus 1200 in a wireless network (for example, the wireless network shown in FIG. 6). The apparatus may be implemented in a network node (e.g., network node 660 shown in FIG. 6). Apparatus 1200 is operable to carry out the example method described with reference to FIG. 11 and possibly any other processes or methods disclosed herein. It is also to be understood that the method of FIG. 11 is not necessarily carried out solely by apparatus 1200. At least some operations of the method can be performed by one or more other entities.

Virtual Apparatus 1200 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause changing unit 1202 and any other suitable units of apparatus 1200 to perform corresponding functions according to one or more embodiments of the present disclosure.

As illustrated in FIG. 12, apparatus 1200 includes changing unit 1202, for, when the SUCI-Calculation-Indicator is changed to a value indicating that the SUCI should be calculated in the USIM from a value indicating that the SUCI should be calculated in a Mobile Equipment, ME, part of the UE, changing a pre-existing public key of the Home Network, HN.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

FIG. 13 depicts a third method in accordance with particular embodiments, comprising step 1302, namely facilitating calculation of the SUCI in a Mobile Equipment, ME, part of the UE only when a SUCI-Calculation-Indicator is set to a value indicating that the SUCI should be calculated in the ME.

Thus, the method may comprise providing to the ME information required for calculation of the SUCI only when the SUCI-Calculation-Indicator is set to a value indicating that the SUCI should be calculated in the ME. More specifically, the method may comprise, in response to a request from the ME for information required for calculation of the SUCI, providing said information to the ME. The method may further comprise, in response to said request from the ME, returning said value of the SUCI-Calculation-Indicator to the ME.

As described above with reference to FIG. 5, the method may comprise, when a SUCI-Calculation-Indicator is set to a value indicating that the SUCI should be calculated in the ME, in response to a request from the ME for the SUCI, rejecting said request. In addition, the method may further comprise, in response to said request from the ME for the SUCI, returning the information required for calculation of the SUCI to the ME. In addition, the method may further comprise, in response to said request from the ME for the SUCI, returning said value of the SUCI-Calculation-Indicator to the ME.

The information required for calculation of the SUCI may comprise a public key of the Home Network, HN, or may comprise information identifying an encryption scheme that is to be used in the calculation of the SUCI.

As described above with reference to FIG. 2, the method may comprise, when a SUCI-Calculation-Indicator is set to a value indicating that the SUCI should be calculated in the USIM, in response to a request from the ME for information required for calculation of the SUCI, rejecting the request from the ME for information required for calculation of the SUCI. In addition, the method may further comprise, when the SUCI-Calculation-Indicator is set to a value indicating that the SUCI should be calculated in the USIM, in response to said request from the ME for information required for calculation of the SUCI, providing the value of the SUCI-Calculation-Indicator to the ME. In addition, the method may further comprise, when a SUCI-Calculation-Indicator is set to a value indicating that the SUCI should be calculated in the USIM, in response to a request from the ME for the SUCI, calculating the SUCI and providing the SUCI to the ME. The method may further comprise, in response to said request from the ME, returning said value of the SUCI-Calculation-Indicator to the ME.

The method of FIG. 13 may further comprise notifying the ME when a value of the SUCI-Calculation-Indicator changes.

FIG. 14 illustrates a schematic block diagram of an apparatus 1400 in a wireless network (for example, the wireless network shown in FIG. 6). The apparatus may be implemented in a wireless device (e.g., wireless device 610 shown in FIG. 6). Apparatus 1400 is operable to carry out the example method described with reference to FIG. 13 and possibly any other processes or methods disclosed herein. It is also to be understood that the method of FIG. 13 is not necessarily carried out solely by apparatus 1400. At least some operations of the method can be performed by one or more other entities.

Virtual Apparatus 1400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause facilitating unit 1402 and any other suitable units of apparatus 1400 to perform corresponding functions according to one or more embodiments of the present disclosure.

As illustrated in FIG. 14, apparatus 1400 includes facilitating unit 1402 for facilitating calculation of the SUCI in a Mobile Equipment, ME, part of the UE only when a SUCI-Calculation-Indicator is set to a value indicating that the SUCI should be calculated in the ME.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

FIG. 15 depicts a fourth method in accordance with particular embodiments, namely a method of operation of a Universal Subscriber Identity Module, USIM, part of a User Equipment, UE, to ensure that a Subscription Concealed Identifier, SUCI, is calculated in the USIM when intended, the method comprising step 1502, namely, when a SUCI-Calculation-Indicator is set to a value indicating that the SUCI should be calculated in the USIM, receiving from a network node proprietary information, which is not known to a Mobile Equipment, ME, part of the UE, and which is required for calculation of the SUCI.

The proprietary information may comprise a relationship between a proprietary encryption scheme identifier and a SUCI calculation encryption scheme, and in that case the SUCI calculation encryption scheme may be standardized. The proprietary information may comprise a proprietary encryption scheme.

The method may further comprise, when the SUCI-Calculation-Indicator is changed to a value indicating that the SUCI should be calculated in the USIM from a value indicating that the SUCI should be calculated in the ME, receiving notification from a Home Network, HN of a changed public key of the HN. In that case, the method may further comprise, when the SUCI-Calculation-Indicator is changed to the value indicating that the SUCI should be calculated in the USIM from the value indicating that the SUCI should be calculated in the ME, receiving notification from the HN of a changed identifier of the public key of the HN.

FIG. 16 illustrates a schematic block diagram of an apparatus 1600 in a wireless network (for example, the wireless network shown in FIG. 6). The apparatus may be implemented in a wireless device (e.g., wireless device 610 shown in FIG. 6). Apparatus 1600 is operable to carry out the example method described with reference to FIG. 15 and possibly any other processes or methods disclosed herein. It is also to be understood that the method of FIG. 15 is not necessarily carried out solely by apparatus 1600. At least some operations of the method can be performed by one or more other entities.

Virtual Apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1602 and any other suitable units of apparatus 1600 to perform corresponding functions according to one or more embodiments of the present disclosure.

As illustrated in FIG. 16, apparatus 1600 includes receiving unit 1602 for, when a SUCI-Calculation-Indicator is set to a value indicating that the SUCI should be calculated in the USIM, receiving from a network node proprietary information, which is not known to a Mobile Equipment, ME, part of the UE, and which is required for calculation of the SUCI.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

FIG. 17 depicts a fifth method in accordance with particular embodiments, namely a method of operation of a Universal Subscriber Identity Module, USIM, part of a User Equipment, UE, to ensure that a Subscription Concealed Identifier, SUCI, is calculated in the USIM when intended, the method comprising step VV1702, namely, when the SUCI-Calculation-Indicator is changed to a value indicating that the SUCI should be calculated in the USIM from a value indicating that the SUCI should be calculated in the ME, receiving notification from a Home Network, HN of a changed public key of the HN.

The method may further comprise, when the SUCI-Calculation-Indicator is changed to the value indicating that the SUCI should be calculated in the USIM from the value indicating that the SUCI should be calculated in the ME, receiving notification from the HN of a changed identifier of the public key of the HN.

FIG. 18 illustrates a schematic block diagram of an apparatus 1800 in a wireless network (for example, the wireless network shown in FIG. 6). The apparatus may be implemented in a wireless device (e.g., wireless device 610 shown in FIG. 6). Apparatus 1800 is operable to carry out the example method described with reference to FIG. 17 and possibly any other processes or methods disclosed herein. It is also to be understood that the method of FIG. 17 is not necessarily carried out solely by apparatus 1800. At least some operations of the method can be performed by one or more other entities.

Virtual Apparatus 1800 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1802 and any other suitable units of apparatus 1800 to perform corresponding functions according to one or more embodiments of the present disclosure.

As illustrated in FIG. 18, apparatus 1800 includes receiving unit 1802 for, when the SUCI-Calculation-Indicator is changed to a value indicating that the SUCI should be calculated in the USIM from a value indicating that the SUCI should be calculated in the ME, receiving notification from a Home Network, HN of a changed public key of the HN.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

FIG. 19 depicts a sixth method in accordance with particular embodiments, namely a method of operation of a Mobile Equipment, ME, part of a User Equipment, UE, to ensure that a Subscription Concealed Identifier, SUCI, is calculated in the Universal Subscriber Identity Module, USIM, part of the UE when intended, the method comprising step 1902, namely, when a SUCI-Calculation-Indicator is set to a value indicating that the SUCI should be calculated in the USIM, deleting any locally stored information required for calculation of the SUCI.

The method may further comprise checking a value of the SUCI-Calculation-Indicator, and calculating the SUCI only if the SUCI-Calculation-Indicator is set to a value indicating that the SUCI should be calculated in the ME.

The information required for calculation of the SUCI may comprise a public key of a Home Network, HN, of the UE, or may comprise information identifying an encryption scheme that is to be used in the calculation of the SUCI.

FIG. 20 illustrates a schematic block diagram of an apparatus 2000 in a wireless network (for example, the wireless network shown in FIG. 6). The apparatus may be implemented in a wireless device (e.g., wireless device 610 shown in FIG. 6). Apparatus 2000 is operable to carry out the example method described with reference to FIG. 19 and possibly any other processes or methods disclosed herein. It is also to be understood that the method of FIG. 19 is not necessarily carried out solely by apparatus 2000. At least some operations of the method can be performed by one or more other entities.

Virtual Apparatus 2000 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause deleting unit WW62 and any other suitable units of apparatus WW60 to perform corresponding functions according one or more embodiments of the present disclosure.

As illustrated in FIG. 20, apparatus 2000 includes deleting unit 2002 for, when a SUCI-Calculation-Indicator is set to a value indicating that the SUCI should be calculated in the USIM, deleting any locally stored information required for calculation of the SUCI.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. An apparatus for ensuring that a Subscription Concealed Identifier (SUCI) is calculated in a Universal Subscriber Identity Module (USIM) part of a user equipment (UE) when intended, wherein the UE further comprises a mobile equipment (ME) part that is separate from the USIM part, the apparatus comprising processing circuitry that is configured to:

provision the USIM part with a SUCI calculation indicator that indicates that the ME part of the UE should not calculate the SUCI for the UE; and set information, which is not known to the ME part of the UE, as required for calculation of the SUCI.

2. The apparatus of claim 1, wherein said information comprises a relationship between a proprietary encryption scheme identifier and a SUCI calculation encryption scheme.

3. The apparatus of claim 2, wherein setting the information comprises provisioning the information to the USIM part of the UE.

4. The apparatus of claim 1, wherein said information comprises a proprietary encryption scheme.

5. The apparatus of claim 1, wherein the apparatus is further adapted to change a public key of a Home Network (HN) when the SUCI calculation indicator is changed from indicating that the SUCI should be calculated in the ME to indicating that the SUCI should be calculated in the USIM.

6. The apparatus of claim 5, wherein the apparatus is further adapted to change an identifier of the public key of the HN when the SUCI calculation indicator is changed to the value indicating that the SUCI should be calculated in the USIM from the value indicating that the SUCI should be calculated in the ME.

7. An apparatus for ensuring that a Subscription Concealed Identifier (SUCI) is calculated in the Universal Subscriber Identity Module (USIM) part of a user equipment (UE) when intended, wherein the UE further comprises a mobile equipment (ME) part that is separate from the USIM part, the apparatus comprising processing circuitry that is configured to:

initially provisioning the USIM part with a SUCI calculation indicator that indicates that the ME part of the UE should calculate the SUCI for the UE, wherein the USIM part stores the SUCI calculation indicator;

changing the SUCI calculation indicator stored by the USIM part such that the SUCI calculation indicator indicates that the SUCI should not be calculated in the ME part;

as a result of the SUCI-calculation indicator being changed from indicating that the SUCI should be calculated in the ME part of the UE to indicating that the SUCI should not be calculated in the ME part of the UE, changing a pre-existing public key of a Home Network (HN).

8. The apparatus of claim 7, wherein the apparatus is further adapted to change an identifier of the public key of the HN when the SUCI calculation indicator is changed to the value indicating that the SUCI should be calculated in the USIM from the value indicating that the SUCI should be calculated in the ME.

9. A Universal Subscriber Identity Module (USIM) of a user equipment (UE) that further comprises a mobile equipment (ME) part that is separate from the USIM, the USIM being configured to:

store a Subscription Concealed Identifier (SUCI) calculation indicator that indicates that the ME part of the UE should not calculate the SUCI for the UE;

determine that the SUCI calculation indicator indicates that the SUCI should not be calculated in the ME part; and refrain from facilitating calculation of the SUCI in the ME part of the UE as a result of the USIM determining that the SUCI calculation indicator indicates that the SUCI should not be calculated in the ME part.

10. The USIM of claim 9, wherein the USIM is further configured to provide to the ME information required for calculation of the SUCI only when the SUCI calculation indicator is set to a value indicating that the SUCI should be calculated in the ME.

11. The USIM of claim 10, wherein the USIM is further configured to provide said information to the ME when a SUCI calculation indicator is set to a value indicating that the SUCI should be calculated in the ME and in response to a request from the ME for information required for calculation of the SUCI.

12. The USIM of claim 11, wherein the USIM is further configured to return a value of the SUCI calculation indicator to the ME in response to said request from the ME.

13. The USIM of claim 10, wherein the USIM is further configured to reject a request from the ME for the SUCI when a SUCI calculation indicator is set to a value indicating that the SUCI should be calculated in the ME.

14. The USIM of claim 13, wherein the USIM is further configured to return the information required for calculation of the SUCI to the ME in response to a request from the ME for the SUCI.

15. The USIM of claim 13, wherein the USIM is further configured to return said value of the SUCI calculation indicator to the ME in response to said request from the ME for the SUCI.

16. The USIM of claim 10, wherein the information required for calculation of the SUCI comprises a public key of the Home Network (HN).

17. The USIM of claim 10, wherein the information required for calculation of the SUCI comprises information identifying an encryption scheme that is to be used in the calculation of the SUCI.

18. The USIM of claim 9, wherein the USIM is further configured to reject a request from the ME for information required for calculation of the SUCI when a SUCI calculation indicator is set to a value indicating that the SUCI should be calculated in the USIM.

19. The USIM of claim 18, wherein the USIM is further configured such that, in response to said request from the ME for information required for calculation of the SUCI, the USIM provides to the ME the value of the SUCI calculation indicator when the SUCI calculation indicator is set to a value indicating that the SUCI should be calculated in the USIM.

20. The USIM of claim 9, wherein the USIM is further configured such that, when a SUCI calculation indicator is set to a value indicating that the SUCI should be calculated in the USIM, the USIM calculates the SUCI and provides the SUCI to the ME in response to a request from the ME for the SUCI.

21. The USIM of claim 20, wherein the USIM is further configured such that, in response to said request from the ME, the USIM returns said value of the SUCI calculation indicator to the ME.

22. The USIM of claim 9, wherein the USIM is further configured such that the USIM notifies the ME when a value of the SUCI calculation indicator changes.

23. A Universal Subscriber Identity Module (USIM) of a user equipment (UE) that further comprises a mobile equipment (ME) part that is separate from the USIM, the USIM being configured to:

store a Subscription Concealed Identifier (SUCI) calculation indicator indicating that the ME part of the UE should not calculate the SUCI for the UE; and receive from a network node information required for calculation of the SUCI, which information is not known to the ME part of the UE.

24. The USIM of claim 23, wherein the information comprises a relationship between a proprietary encryption scheme identifier and a SUCI calculation encryption scheme.

25. The USIM of claim 24, wherein the SUCI calculation encryption scheme is standardized.

26. The USIM of claim 23, wherein the information comprises a proprietary encryption scheme.

* * * * *

UNITED STATES PATENT AND TRADEMARK OFFICE
CERTIFICATE OF CORRECTION

PATENT NO. : 10,834,580 B2  
APPLICATION NO. : 16/811629  
DATED : November 10, 2020  
INVENTOR(S) : Nakarmi et al.

Page 1 of 1

It is certified that error appears in the above-identified patent and that said Letters Patent is hereby corrected as shown below:

In the Specification

In Column 1, Line 7, delete "2019 (status pending)," and insert -- 2019, now Pat. No. 10,631,161, --, therefor.

In Column 11, Line 65, delete "manner In" and insert -- manner. In --, therefor.

In Column 13, Line 1, delete "690 and" and insert -- 692 and --, therefor.

In Column 14, Line 17, delete "(CPE). a" and insert -- (CPE), a --, therefor.

In Column 15, Lines 3-4, delete "Radio front end circuitry 614" and insert -- Radio front end circuitry 612 --, therefor.

In Column 16, Line 7, delete "manner In" and insert -- manner. In --, therefor.

In Column 17, Lines 64-65, delete "power source 733," and insert -- power source 713, --, therefor.

In Column 22, Lines 6-7, delete "8200 that each" and insert -- 8200 each --, therefor.

In Column 22, Line 38, delete "according one" and insert -- according to one --, therefor.

In Column 27, Line 14, delete "step VV1702," and insert -- step 1702, --, therefor.

In Column 28, Line 46, delete "deleting unit WW62" and insert -- deleting unit 2002 --, therefor.

In Column 28, Line 47, delete "apparatus WW60" and insert -- apparatus 2000 --, therefor.

In Column 28, Line 48, delete "according one" and insert -- according to one --, therefor.

Signed and Sealed this  
Twenty-second Day of June, 2021

Drew Hirshfeld  
*Performing the Functions and Duties of the*  
*Under Secretary of Commerce for Intellectual Property and*  
*Director of the United States Patent and Trademark Office*